(12) United States Patent
Murashima et al.

(10) Patent No.: US 8,503,871 B2
(45) Date of Patent: Aug. 6, 2013

(54) IMAGING SYSTEM, MOUNT ADAPTOR, IMAGING APPARATUS, AND PROGRAM

(75) Inventors: Nobuharu Murashima, Nara (JP);
Makibi Nakamura, Tokyo (JP);
Norihiko Akamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 21 days.

(21) Appl. No.: 13/283,978

(22) Filed: Oct. 28, 2011

(65) Prior Publication Data

US 2012/0163786 A1 Jun. 28, 2012

(30) Foreign Application Priority Data

Dec. 24, 2010 (JP) ................................ 2010-288025

(51) Int. Cl.
*G03B 17/00* (2006.01)
(52) U.S. Cl.
USPC ........................................... 396/71; 396/530
(58) Field of Classification Search
USPC ......... 396/71, 90–93, 104, 529, 530; 348/345
See application file for complete search history.

(56) References Cited

U.S. PATENT DOCUMENTS

| | | | |
|---|---|---|---|
| 7,260,322 B2 * | 8/2007 | Ide et al. | 396/71 |
| 2009/0147086 A1 * | 6/2009 | Uchida | 348/187 |
| 2010/0091175 A1 | 4/2010 | Shintani et al. | |

FOREIGN PATENT DOCUMENTS

WO WO 2008/099605 A1 8/2008

OTHER PUBLICATIONS

U.S. Appl. No. 13/280,812, filed Oct. 25, 2011, Akamatsu, et al.

* cited by examiner

*Primary Examiner* — W B Perkey
*Assistant Examiner* — Minh Phan
(74) *Attorney, Agent, or Firm* — Sony Corporation

(57) ABSTRACT

An imaging system includes an imaging apparatus which is provided with an imaging device and a mount adaptor which adjusts a flange focal length between the imaging apparatus and an interchangeable lens, wherein the mount adaptor is provided with a phase difference focus detection section which performs focus detection from a phase difference and an optical device which splits incident light from the interchangeable lens into incident light of the imaging device and incident light of the phase difference focus detection section, and the imaging apparatus is provided with a contrast focus detection section which performs focus detection from contrast using the imaging device, an adjustment section which adjusts the focus position of the phase difference focus detection section, and an adjustment control section which activates adjustment control of the focus position using detection of the mounting of the mount adaptor and the interchangeable lens.

8 Claims, 8 Drawing Sheets

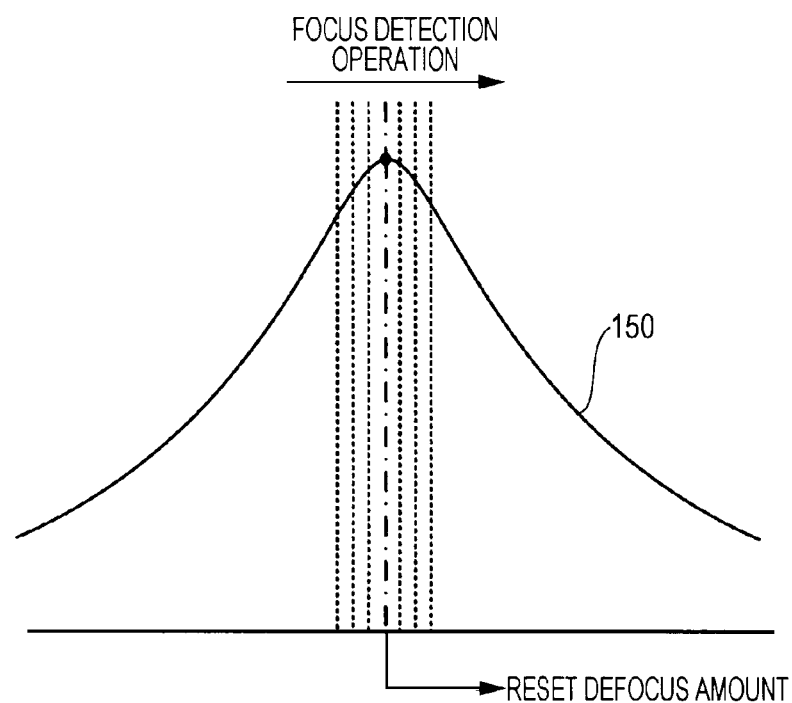

| CAMERA | LENS | ADJUSTMENT AMOUNT |
|--------|------|-------------------|
| CB0 | L0 | dm00 |
| CB0 | L1 | dm01 |
| ... | ... | ... |
| CB1 | L0 | dm10 |
| CB1 | L1 | dm11 |
| ... | ... | ... |

IMAGING SYSTEM, MOUNT ADAPTOR, IMAGING APPARATUS, AND PROGRAM

BACKGROUND

The present disclosure relates to an imaging system, a mount adaptor, an imaging apparatus, and a program.

In recent years, there has been a rapid expansion in the use of digital single-lens reflex cameras, but it has not been possible to respond to the demand for a further reduction in size and weight in camera body size. This is because it is necessary for a single-lens reflex digital camera to accommodate a reflex mirror which switches between an imaging light path and a finder light path and a pentaprism which guides a subject image to a finder (OVF: Optical View Finder) in the camera body.

Therefore, by providing an electronic view finder (EVF) instead of an OVF, a digital single-lens camera (mirrorless digital single-lens camera) referred to as mirrorless, which achieves a reduction in size and weight by removing the reflex mirror, has been introduced. However, the mirrorless digital single-lens camera is not able to perform focus detection in the phase difference detection method using the camera main body due to a sub-mirror which guides the incident light to the focus detection section being removed along with the reflex mirror.

In addition, since the mirrorless digital single-lens camera shortens the flange focal length compared to the digital single-lens reflex camera, an interchangeable lens which was able to be mounted on the digital single-lens reflex camera is not able to be used as it is. Therefore, in order to effectively use the interchangeable lens resources in the related art, the mirrorless digital single-lens camera is made to be able to mount the interchangeable lens used with the digital single-lens reflex camera via a mount adaptor.

Then, in order for it to be possible to mount the interchangeable lens which corresponds to a phase difference detection method, there is a proposal for an imaging apparatus which is provided with a focus detection section of the phase difference detection method in the mount adaptor (for example, International Publication No. 2008/099605).

SUMMARY

However, the proposed imaging apparatus has a flaw in that an error in an AF (Auto Focus) sensor focal length, where equivalence with the flange focal length is necessary, increases due to the mount adaptor as an intermediate accessory between the camera body and the interchangeable lens being mounted. The AF sensor focal length is the distance from the mount surface of the interchangeable lens to the AF sensor, and an error in the AF sensor focal length reduces the accuracy of the focus adjustment and is a cause of a reduction in the quality of a recording image.

In addition, the camera body is able to perform contrast AF (image AF) using an image sensor which is provided in the camera body and the error in the flange focal length has no effect on focus adjustment. As a result, an AF sensor (phase difference AF sensor) which is provided in the mount adaptor is inferior in terms of accuracy compared to the contrast AF and usability in a situation when there is a desire to perform precise focus adjustment is not sufficient.

It is desirable that an imaging system, a mount adaptor, an imaging apparatus, and a program be provided which are able to improve focus adjustment of an AF sensor which is provided in the mount adaptor.

An imaging system according to an embodiment of the disclosure is provided with an imaging apparatus which is provided with an imaging device and a mount adaptor which adjusts the flange focal length between the imaging apparatus and an interchangeable lens.

The mount adaptor is provided with a phase difference focus detection section and an optical device. The phase difference focus detection section performs focus detection from a phase difference. The optical device splits incident light from the interchangeable lens into incident light of the imaging device and incident light of the phase difference focus detection section.

The imaging apparatus is provided with a contrast focus detection section, an adjustment section, and an adjustment control section. The contrast focus detection section performs focus detection from contrast using the imaging device. The adjustment section adjusts the focus position of the phase difference focus detection section. The adjustment control section activates adjustment control of the focus position using detection of the mounting of the mount adaptor and the interchangeable lens.

In addition, a mount adaptor according to another embodiment of the disclosure which adjusts a flange focal length between an imaging apparatus and an interchangeable lens is provided with a phase difference focus detection section, an optical device, and a storage section. The phase difference focus detection section performs focus detection from a phase difference. The optical device splits incident light from the interchangeable lens into incident light of the imaging apparatus and incident light of the phase difference focus detection section. The storage section stores an adjustment value which adjusts the focus position of the phase difference focus detection section.

In addition, an imaging apparatus according to still another embodiment of the disclosure is provided with a defocus amount acquisition section, a contrast focus detection section, and a storage section. The defocus amount acquisition section adjusts a flange focal length between the imaging apparatus and an interchangeable lens and acquires, from a mount adaptor which has a phase difference focus detection section which performs focus detection using a phase difference method by splitting incident light from an interchangeable lens, a defocus amount of the phase difference focus detection section. The contrast focus detection section performs focus detection from contrast using an imaging device. The storage section stores an adjustment value which adjusts the focus position of the phase difference focus detection section.

According to the imaging system, the mount adaptor, and the imaging apparatus described above, it is possible to improve the focus accuracy of the AF sensor which is provided in the mount adaptor.

BRIEF DESCRIPTION OF THE DRAWINGS

FIG. 5 is a diagram illustrating an example of a defocus amount adjustment of the AF sensor unit according to the first embodiment;

FIG. 6 is a diagram illustrating one example of an adjustment information table of an imaging apparatus according to the first embodiment;

DETAILED DESCRIPTION OF EMBODIMENTS

Below, embodiments of the disclosure will be described with reference to the diagrams.

First Embodiment

Figure 1:
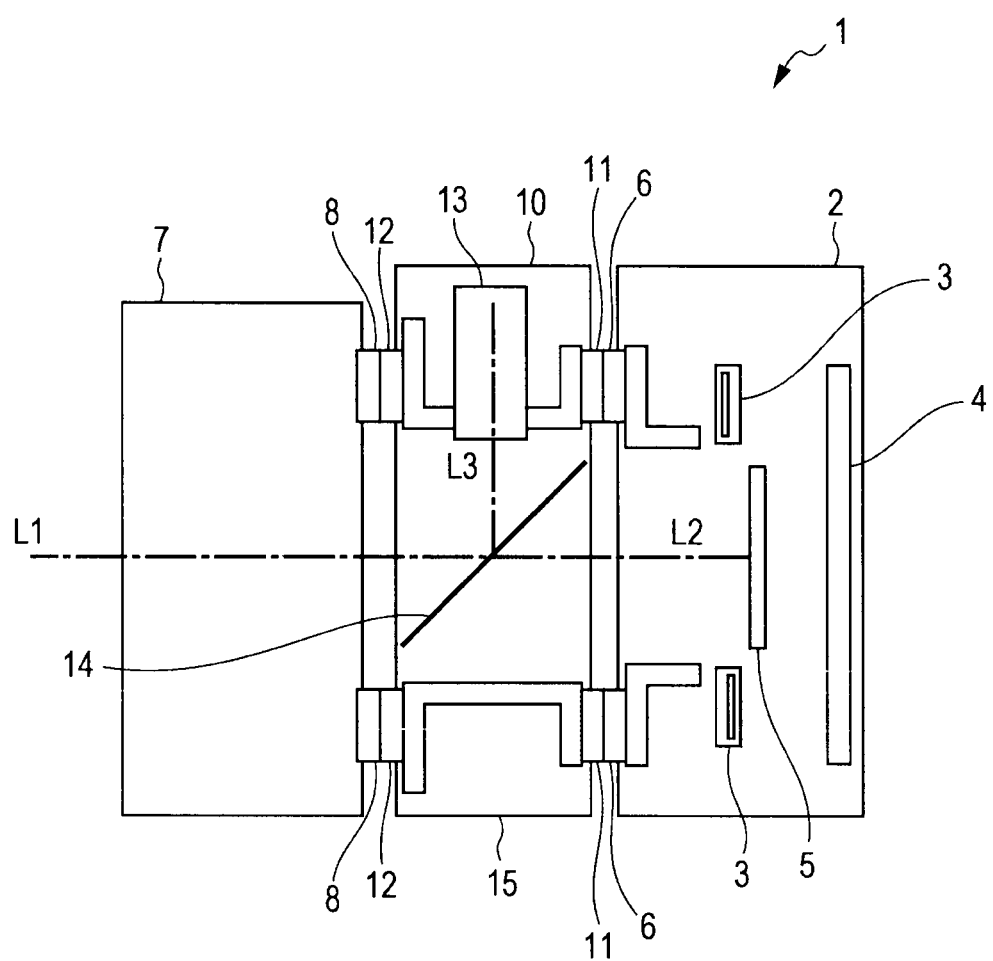
FIG. 1 is a diagram illustrating a configuration example of an imaging system according to a first embodiment.

First, the overall configuration of an imaging system according to a first embodiment will be described using FIG. 1. FIG. 1 is a diagram illustrating a configuration example of the imaging system according to the first embodiment.

An imaging system 1 is provided with an imaging apparatus (camera body) 2, a mount adaptor 10, and a lens (interchangeable lens) 7. The imaging apparatus 2 is a camera body of a mirrorless digital single-lens camera where a reduction in size and weight has been achieved by shortening the flange focal length more than in a digital single-lens reflex camera. The lens 7 is an interchangeable lens for a digital single-lens reflex camera and it is not possible for the lens 7 to be directly mounted on the imaging apparatus 2 since the flange focal length is different. In addition, there are cases where it is not possible for the lens 7 to be mounted on the imaging apparatus 2 since the interface is different.

The mount adaptor 10 is mounted between the imaging apparatus 2 and the lens 7. The mount adaptor 10 adjusts the flange focal length which is different between the mirrorless digital single-lens camera and the digital single-lens reflex camera. Since the flange focal length of the mirrorless digital single-lens camera is shorter than the flange focal length of the digital single-lens reflex camera, the flange focal length which corresponds to the lens 7 is adjusted using the mounting of the mount adaptor 10.

The imaging apparatus 2 is provided with a shutter 3, a rear surface LCD (Liquid Crystal Display) 4, an imaging device 5, and a mount 6, along with a control device, a battery, various types of operation sections such as a release button, various types of sensors, and the like which are not shown. Along with imaging of the subject by detecting the light which passes by the shutter 3, the imaging device 5 performs image output for the rear surface LCD 4 to function as an EVF and focus detection with a contrast method.

The mount 6 is a connection portion for mounting a lens which corresponds to the mirrorless digital single-lens camera onto the imaging apparatus 2. The mount 6 has a connection portion shape for holding the lens and has a contact point for inputting and outputting various types of information such as focus detection information (for example, distance measurement information) and information on the aperture between the lens and the imaging apparatus 2.

The mount adaptor 10 is provided with a mount 11, a mount 12, an AF sensor unit 13, a thin film mirror (pellicle mirror) 14, and a camera cone 15 along with a control device, a display section, various types of operation sections, and the like which are not shown. Here, the mount adaptor 10 may be provided with a cover portion with light transmissivity (for example, protective glass, a filter, or the like) which is not shown in an opening on the imaging apparatus 2 side and an opening on the lens 7 side. Along with preventing the entry of dirt or dust into an inner portion, the cover portion protects the AF sensor unit 13 and the thin film mirror 14 from being damaged from the outside.

The mount 11 is a connection portion for mounting the mount adaptor 10 onto the imaging apparatus 2. The mount 11 has a connection portion shape for being held by the imaging apparatus 2 and has a contact point for inputting and outputting various types of information such as focus detection information and information on the aperture between the imaging apparatus 2 and the mount adaptor 10. The mount 12 is a connection portion for mounting the lens 7 which corresponds to the digital single-lens reflex camera onto the mount adaptor 10. The mount 12 has a connection portion shape for holding the lens 7 and has a contact point for inputting and outputting various types of information such as focus detection information and information on the aperture between the imaging apparatus 2 and the lens 7.

The AF sensor unit (focus detection section) 13 is configured to include optical members such as a condenser lens, an IR (InfraRed) cut filter, an aperture mask, a separator lens, and the like, and performs focus detection with a phase difference method by light which is lead in from a subject being incident on an AF sensor. The AF sensor unit 13 outputs focus detection information such as distance measurement used in, for example, focus adjustment. Here, the AF sensor unit 13 is provided in a position which is the AF sensor focal length which corresponds to the flange focal length of the digital single-lens reflex camera.

The thin film mirror 14 is an optical device which splits light L1 which is incident from the subject side (lens 7 side) into light L2 which is incident on the imaging device 5 and light L3 which is incident on the AF sensor unit 13. The thin mirror film 14 is a thin film mirror with a fixed type of semi-transmissivity, and for example, splits approximately 70% of the incident light L1 into the light L2 which is incident on the imaging device 5 and approximately 30% of the incident light L1 into the light L3 which is incident on the AF sensor unit 13. Due to the incident light being split by the thin film mirror 14, it is possible for the imaging apparatus 2 to perform focus detection using the AF sensor unit 13 and focus detection with a contrast method using the imaging device 5 at the same time with regard to the same subject.

The camera cone 15 is substantially a cylindrical shape and has the AF sensor unit 13 and the thin film mirror 14 at an inner portion thereof. The camera cone length of the camera cone 15 is a length where the distance from the mount surface of the lens 7 to the imaging device 5 is the flange focal length which corresponds to the lens 7 when mounted between the imaging apparatus 2 and the lens 7. The camera cone 15 arranges the AF sensor unit 13 in a returning light path of the thin film mirror 14 in the camera cone.

In this manner, it is possible for the mount adaptor 10 to mount the lens 7 which corresponds to the digital single-lens reflex camera onto the imaging apparatus 2 which is a mirrorless digital single-lens camera by adjusting the flange focal length.

In addition, even in a case where the interchangeable lens does not have an AF sensor, it is possible for the imaging system 1 to perform focus detection using the phase difference method due to the mount adaptor 10 having the AF sensor unit 13.

Here, in a case where the interchangeable lens does not have an AF sensor and the mount adaptor 10 is not mounted, the imaging apparatus 2 performs focus detection using the contrast method. Accordingly, the imaging apparatus 2 performs focus adjustment by switching between the focus detection using phase difference method and the focus detection using the contrast method in accordance with the mount adaptor 10 or the interchangeable lens which is connected to the imaging apparatus 2.

The lens 7 is an interchangeable lens which corresponds to the digital single-lens reflex camera, and along with being provided with a mount 8, the lens 7 is provided with a driving mechanism which drives the lens, an aperture adjustment mechanism which adjusts the aperture, a control section for controlling the mechanism sections, and the like.

The mount 8 is a connection portion for mounting the lens 7 onto the corresponding digital single-lens reflex camera. The mount 8 has a connection portion shape for being held by the digital single-lens reflex camera and has a contact point for inputting and outputting various types of information such as focus detection information and information on the aperture using the lens 7 and the digital single-lens reflex camera. In addition, the mount 8 is a connection portion for mounting the lens 7 onto the mount adaptor 10. The mount 8 is able to input and output various types of information such as focus detection information and information on the aperture with the mount adaptor 10 in the same manner as the digital single-lens reflex camera. Here, the inputting and outing of information between the lens 7 and the mount adaptor 10 may be performed directly by the control sections thereof or may be performed through the control section of the imaging apparatus 2.

Figure 2:
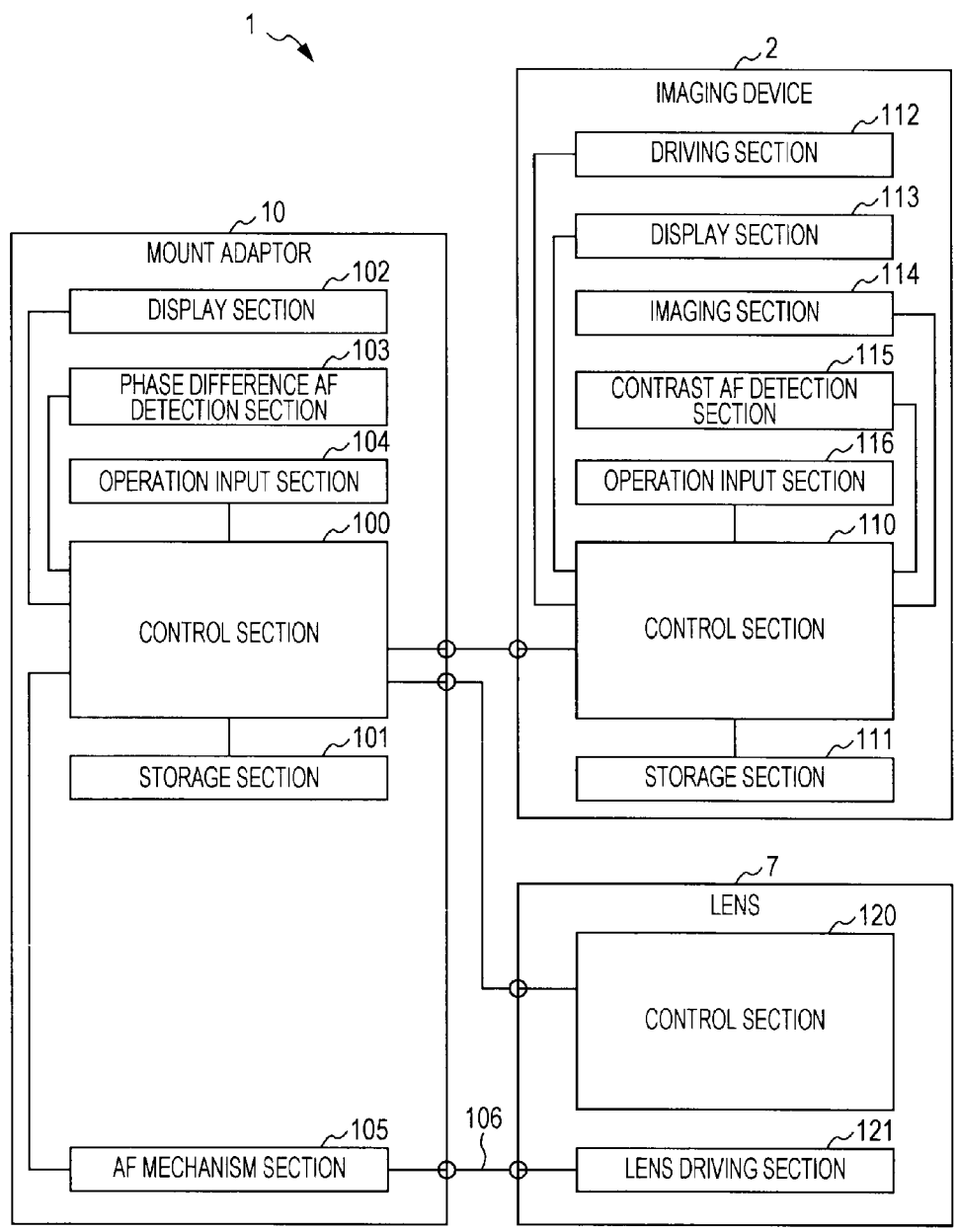
FIG. 2 is a diagram illustrating a block configuration example of the imaging system according to the first embodiment.

Next, a block configuration of the imaging system 1 according to the first embodiment will be described using FIG. 2. FIG. 2 is a diagram illustrating a block configuration example of the imaging system 1 according to the first embodiment.

The imaging apparatus 2 is provided with a control section 110, a storage section 111, a driving section 112, a display section 113, an imaging section 114, a contrast AF detection section 115, and an operation input section 116.

The storage section 111 stores adjustment information for performing focus adjustment of a phase difference AF detection section 103 which is provided in the mount adaptor 10 which is mounted on the imaging apparatus 2. The storage section 111 is, for example, configured by a non-volatile storage medium such as a flash memory, an EEPROM (Electrically Erasable Programmable ROM), or the like in order to retain adjustment information when cut off from a power source. The adjustment information is specifically an adjustment value of the defocus amount of the phase difference AF detection section 103, but may be other numerical values corresponding to the defocus amount. The adjustment information includes a plurality of items of information which corresponds to the lens 7 since the adjustment information is information which differs for each lens 7. It is possible to identify the lens 7 by acquiring identification information of the lens 7 from the control section 110.

The driving section 112 drives an actuator (a solenoid, a motor, or the like) provided in the imaging section 2. For example, the driving section 112 drives the shutter 3. The display section 113 performs display on a display device which is provided in the imaging apparatus 2. For example, along with performing the image display on the rear surface LCD 4 as an EVF, the display section 113 performs display of a reproduction of an image which has been imaged and user interface displays of various types of operations.

The imaging section 114 images a subject using the imaging device 5. The contrast AF detection section (contrast focus detection section) 115 performs focus detection using the contrast method using the imaging device 5. The operation input section 116 is a release button, other operation switches, and the like and receives an AF operation, a shutter operation, selection of a function of the imaging system 1 such as switching of displays, and an execution operation.

The control section 110 controls the entirety of the imaging apparatus 2 and performs focus adjustment of the phase difference AF detection section 103 which is provided in the mount adaptor 10 and switching of the activation and deactivation of the focus adjustment function based on the focus detection using the contrast AF detection section 115. In addition, the control section 110 inputs and outputs various types of information with a control section 100 of the mount adaptor 10 which will be described later.

The mount adaptor 10 is provided with the control section 100, a storage section 101, a display section 102, the phase difference AF detection section 103, an operation input section 104, and an AF mechanism section 105. The control section 100 controls the entirety of the mount adaptor 10 and inputs and outputs various types of information with the control section 110 of the imaging section 2. In addition, the control section 100 inputs and outputs various types of information with a control section 120 of the lens 7. The control section 100 has a relay function in a case where various types of information are mutually transferred between the control section 110 and the control section 120.

The storage section 101 stores adjustment information for performing focus adjustment of the phase difference AF detection section 103. The storage section 101 is, for example, configured by a non-volatile storage medium such as a flash memory, an EEPROM, or the like in order to retain adjustment information when cut off from a power source. The adjustment information is an adjustment value of the defocus amount of the phase difference AF detection section 103, but may be other numerical values corresponding to the defocus amount. The adjustment information includes a plurality of items of information which corresponds to the lens 7 since the adjustment information is information which differs for each lens 7. It is possible to identify the lens 7 by acquiring identification information of the lens 7 from the control section 110.

The display section 102 performs an information display of the focus detection state of the phase difference AF detection section 103. For example, the display section 102 is an LED (Light Emitting Diode) and displays a guide on the focus detection state of the phase difference AF detection section 103 as exactly in focus, focal point in front of a subject, or focal point behind a subject using a flashing state (color, flashing cycle, or the like).

The phase difference AF detection section (phase difference focus detection section) 103 performs focus detection using the phase difference method using the AF sensor unit 13. The phase difference AF detection section 103 adjusts the focus detection position which is exactly in focus based on the adjustment information stored in the storage section 101 or the storage section 111.

The operation input section 104 is an AF operation button, other operation switches, or the like and receives an AF operation, selection of a function of the mount adaptor 10 such as switching of display, and an execution operation.

The AF mechanism section 105 is an actuator such as a motor and the amount of driving is controlled by the control section 100. The AF mechanism section 105 transfers a driving force by being mechanically connected to a lens driving section 121 of the lens 7 (driving force transferring section 106) and performs focus adjustment by driving the lens of the lens 7. At this time, the control section 100 calculates the amount of driving based on the focus information which is detected by the phase difference AF detection section 103 or the contrast AF detection section 115.

The lens 7 is provided with the control section 120 and the lens driving section 121. The control section 120 controls the entirety of the lens 7 and inputs and outputs various types of information with the control section 100 of the mount adaptor 10. In addition, in a case where the lens 7 is provided with an aperture adjustment mechanism section, an information display section, and the like which are not shown, the control section 120 controls these sections. In addition, the lens 7 may be provided with a driving section which drives the lens driving section 121, and in this case, the control section 120 drives the driving section by receiving instruction on the amount of driving from the control section 100.

In this manner, it is possible for the imaging system 1 to mount the lens 7 which corresponds to the digital single-lens reflex camera onto the imaging apparatus 2. Then, the imaging system 1 is able to perform focus adjustment which reduces the effect of flange focal length error which is built up in the imaging apparatus 2 and the mount adaptor 10.

Figure 3:
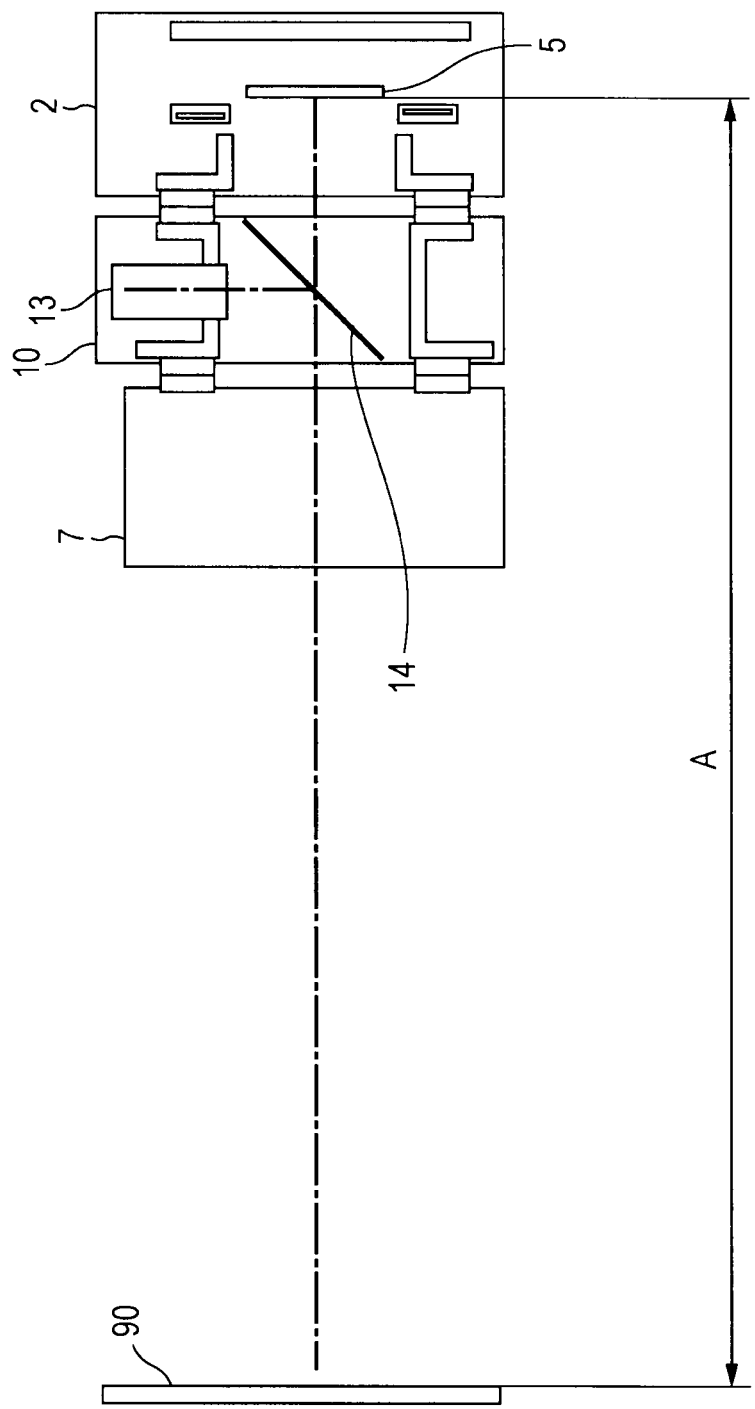
FIG. 3 is a diagram illustrating a defocus amount adjustment environment of an AF sensor unit according to the first embodiment.

Next, the defocus amount adjustment environment of the AF sensor unit according to the first embodiment will be described using FIG. 3. FIG. 3 is a diagram illustrating the defocus amount adjustment environment of the AF sensor unit according to the first embodiment.

As described above, the imaging system 1 is configured so that the imaging apparatus 2 is provided with the imaging device 5 and the mount adaptor 10 is provided with the AF sensor unit 13. As a result, the imaging system 1 has a flange focal length error (design value) for each of the distance from the mount surface of the lens 7 to the imaging device 5 and the distance from the mount surface of the lens 7 to the AF sensor unit 13 due to variation in the dimensional accuracy and variation when processing. Since it is often the case that each of the imaging apparatus 2 and the mount adaptor 10 are shipped to the market as separate products, it is not possible to perform adjustment in advance by combining a predetermined imaging apparatus 2 and a predetermined mount adaptor 10.

In addition, in a case where the lens 7 is swapped for the purpose of imaging, differences in the spherical aberration of each lens, manufacturing errors and the like are causes of reductions in the focus detection accuracy of the AF sensor unit 13.

Accordingly, when the imaging apparatus 2, the mount adaptor 10, and also the lens 7 are combined, it is not possible for the imaging system 1 to obtain sufficient accuracy in the focus adjustment using the AF sensor unit 13.

However, in the focus detection with the contrast method using the imaging device 5, since the focus detection is performed with the imaging device which images, it is possible to perform focus detection with sufficient accuracy without receiving any effect due to the combination of the imaging apparatus 2, the mount adaptor 10, and also the lens 7.

In addition, it is possible for the focus detection using the AF sensor unit 13 and the focus detection with the contrast method using the imaging device 5 to be performed at the same time with regard to the same subject. The adjustment operation is performed by a reference chart 90, which is positioned at a distance A from the imaging device 5 (virtual imager image plane), as the subject.

The imaging system 1 generates adjustment information which resets the remaining defocus amount of the focus detection using the AF sensor unit 13 to zero in combination with the focus detection with the contrast method and the adjustment information is stored in one of or both of the storage section 111 or the storage section 101. Due to this, the imaging system 1 is able to adjust the focus detection using the AF sensor unit 13 according to the adjustment information. For the combination of the imaging apparatus 2, the mount adaptor 10 and the lens 7 which generate the adjustment information, the imaging system 1 is able to improve the accuracy of the focus detection using the AF sensor unit 13.

Here, the acquisition of the remaining defocus amount may be performed by the focus detection using a normal subject instead of the reference chart 90. For example, it is possible that the acquisition of the remaining defocus amount using the reference chart 90 is performed in a process before the shipment of the product, when maintenance is carried out at a service center, and the like and the acquisition of the remaining defocus amount using a normal subject is performed by the user when necessary.

Figure 4:
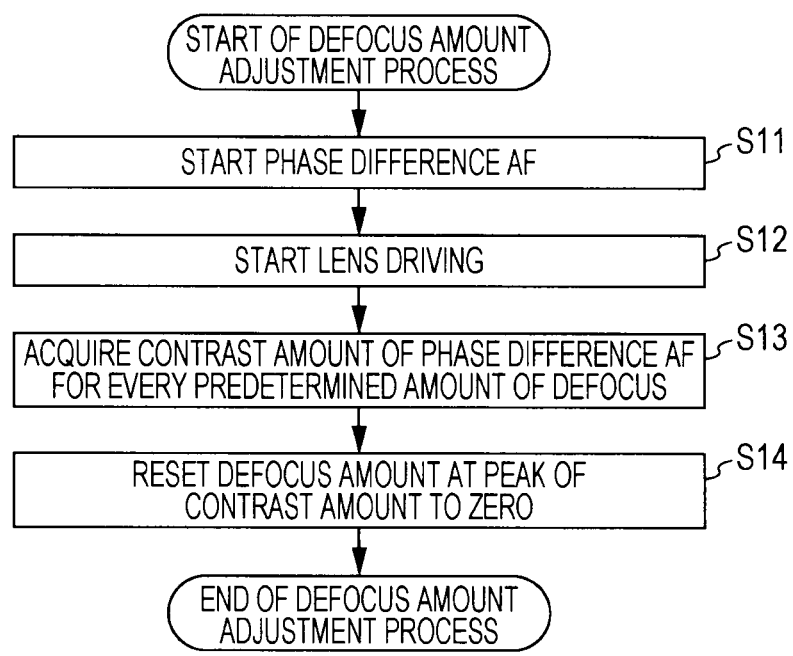
FIG. 4 is a flowchart of a defocus amount adjustment process according to the first embodiment.

Next, the defocus amount adjustment of the AF sensor unit according to the first embodiment will be described using FIGS. 4 to 6. FIG. 4 is a flowchart of the defocus amount adjustment process according to the first embodiment. FIG. 5 is a diagram illustrating an example of the defocus amount adjustment of the AF sensor unit according to the first embodiment. FIG. 6 is a diagram illustrating one example of an adjustment information table of the imaging apparatus according to the first embodiment.

First, a defocus amount adjustment process which is executed by the imaging apparatus 2 will be described. In the defocus amount adjustment process, the adjustment information of the AF sensor unit 13 is acquired by the imaging apparatus 2 performing the focus detection with the contrast method and the phase difference method in parallel.

[Step S11] The imaging apparatus 2 starts a focus detection operation using the phase difference method using the AF sensor unit 13.

[Step S12] The imaging apparatus 2 starts driving of the lens 7.

[Step S13] The imaging apparatus 2 performs focus detection from a position where the focal point is in front of a subject through an exact focus position until a position where the focal point is behind a subject while driving the lens 7 in predetermined defocus amount units of the AF sensor unit 13 (FIG. 5). In addition, the imaging apparatus 2 performs the focus detection using the phase difference method in parallel with the focus detection using the contrast method and a contrast AF output 150 (contrast amount) is acquired for every defocus amount of the AF sensor unit 13.

[Step S14] The imaging apparatus 2 acquires an adjustment value (remaining defocus amount) which resets (clears to zero) the remaining defocus amount of the AF sensor unit 13 when combining the focus detection using the peak value of the contrast amount, that is, the focus detection using the contrast method. The imaging apparatus 2 stores the adjustment value in the storage section 111 so as to correspond to the combination of the mount adaptor 10 and the lens 7 and ends the defocus amount adjustment process. The adjustment value which is acquired in this manner is stored in the storage section 111 as an imaging apparatus adjustment information table 130. Here, the acquisition of the adjustment value in a case which depends on the user may be performed by selecting of an adjustment value (for example, −3P to 0 to +3P) with a predetermined pitch which is set in advance instead of acquiring the adjustment value based on the focus detection using a contrast focus detection section. Here, the predetermined pitch is, for example, the lens driving amount or the like.

The imaging apparatus adjustment information table 130 is a data table where an adjustment amount corresponds to a combination of the mount adapter 10 and the lens 7. For example, with the combination of the mount adaptor (MA0) and the lens (L0), the corresponding adjustment amount is an adjustment amount (db00). If it is the lens (L1) with the mount adaptor (MA0), the corresponding adjustment amount is an adjustment amount (db01). In addition, if it is the mount adaptor (MA1) with the lens (L1), the corresponding adjustment amount is an adjustment amount (db11).

Due to this, if the adjustment amount is recorded in the imaging apparatus adjustment information table 130, it is possible for the imaging apparatus 2 to use this so that, even if there is a change in the combination of the mount adaptor 10 and the lens 7, it is not necessary to execute the defocus amount adjustment process at this time.

Here, the imaging apparatus 2 acquires identification information of the mount adaptor 10 from the mount adaptor 10 when the mount adaptor 10 is mounted on the imaging apparatus 2 and identification of the mount adaptor 10 is performed. In addition, the imaging apparatus 2 acquires identification information of the lens 7 from the mount adaptor 10 when the lens 7 is mounted on the imaging apparatus 2 using the mount adaptor 10 and identification of the lens 7 is performed. The identification information of the mount adaptor 10 and the identification information of the lens 7 is, for example, an individual identification code or a product identification code. Due to each unit having errors even if it is the same product, it is desirable that identification of the mount adaptor 10 and the lens 7 be performed using individual identification codes. Here, since considering that it is generally seldom that a user has a plurality of the same product, there are no problems in practice even if the identification of the mount adaptor 10 and the lens 7 is performed using product identification codes.

Figure 7:
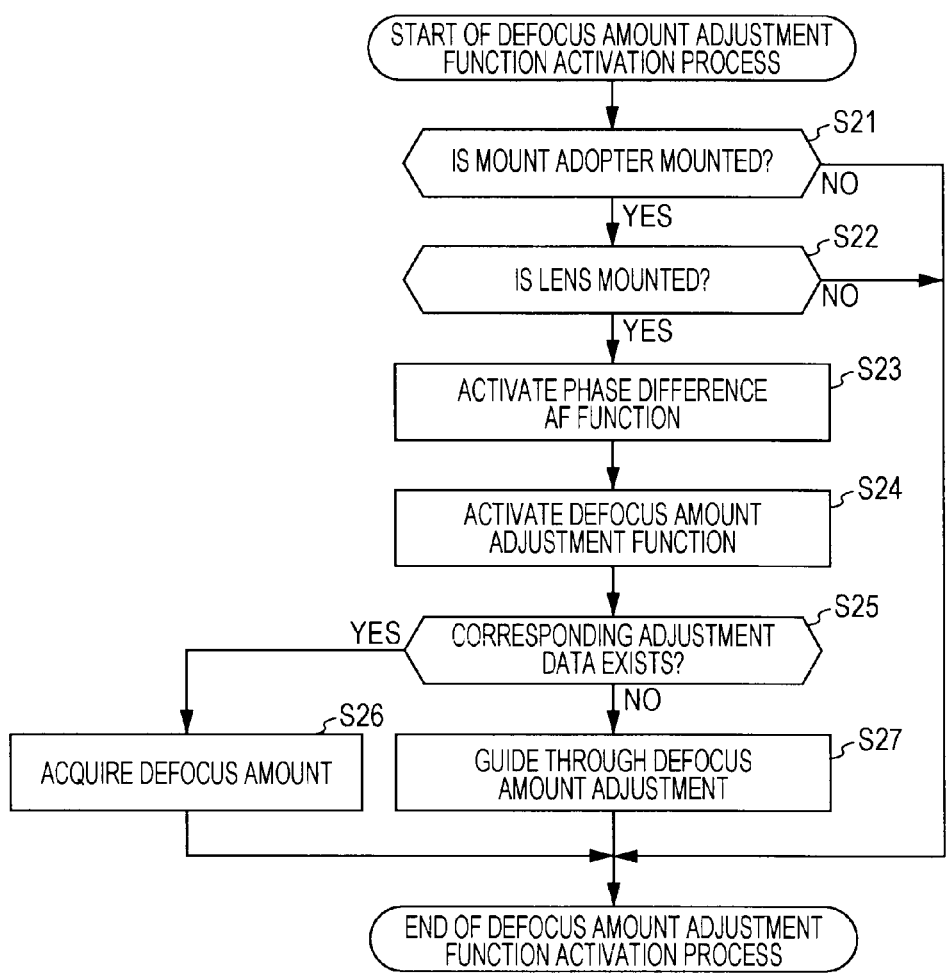
FIG. 7 is a flowchart of a defocus amount adjustment function activation process according to the first embodiment.

Next, a defocus amount adjustment function activation process which is executed by the imaging apparatus 2 will be described using FIG. 7. FIG. 7 is a flowchart of a defocus amount adjustment function activation process according to the first embodiment. The imaging apparatus 2 executes the defocus amount adjustment function activation process when the power source of the imaging apparatus 2 is turned on or when detecting the mounting of the mount adaptor 10 or the lens 7.

[Step S21] The imaging apparatus 2 performs determination of whether the mount adaptor 10 is mounted. Here, the mount adaptor which is the determination target is the mount adaptor 10 which is provided with the AF sensor unit 13. If the imaging apparatus 2 determines that the mount adaptor 10 is mounted, the process progresses to step S22, and if the imaging apparatus 2 determines that the mount adaptor 10 is not mounted, the defocus amount adjustment function activation process ends.

[Step S22] The imaging apparatus 2 performs determination of whether the lens 7 is mounted. If the imaging apparatus 2 determines that the lens 7 is mounted, the process progresses to step S23 and if the imaging apparatus 2 determines that the lens 7 is not mounted, the defocus amount adjustment function activation process ends.

[Step S23] The imaging apparatus 2 activates a phase difference AF function using the AF sensor unit 13. Due to this, it is possible for the user to use the focus detection using the phase difference method and the focus detection using the contrast method.

[Step S24] The imaging apparatus 2 activates the defocus amount adjustment function of the AF sensor unit 13.

[Step S25] The imaging apparatus 2 determines whether or not the adjustment data (adjustment amount), which corresponds to the combination of the mount adaptor 10 and the lens 7 where the mounting thereof has been detected, is in the imaging apparatus adjustment information table 130. The imaging apparatus 2 progresses to step S26 in a case where there is the corresponding adjustment data and the imaging apparatus 2 progresses to step S27 in a case where there is no corresponding adjustment data.

[Step S26] The imaging apparatus 2 acquires the defocus amount (the adjustment data which corresponds to the combination of the mount adaptor 10 and the lens 7 where the mounting thereof has been detected) from the imaging apparatus adjustment information table 130 and ends the defocus amount adjustment function activation process. Due to this, it is possible for the AF sensor unit 13 to perform the focus detection by adjusting the defocus amount using the acquired adjustment data and the focus accuracy is improved.

[Step S27] The imaging apparatus 2 performs guidance of the defocus amount adjustment (for example, displaying on the display section 113) and ends the defocus amount adjustment function activation process.

In this manner, the phase difference AF function is activated based on the detection of the mounting of the mount adaptor 10 and the lens 7 and the imaging apparatus 2 improves the focus accuracy of the AF sensor unit 13 using the defocus amount adjustment which corresponds to the combination of the mount adaptor 10 and the lens 7.

Figure 8:
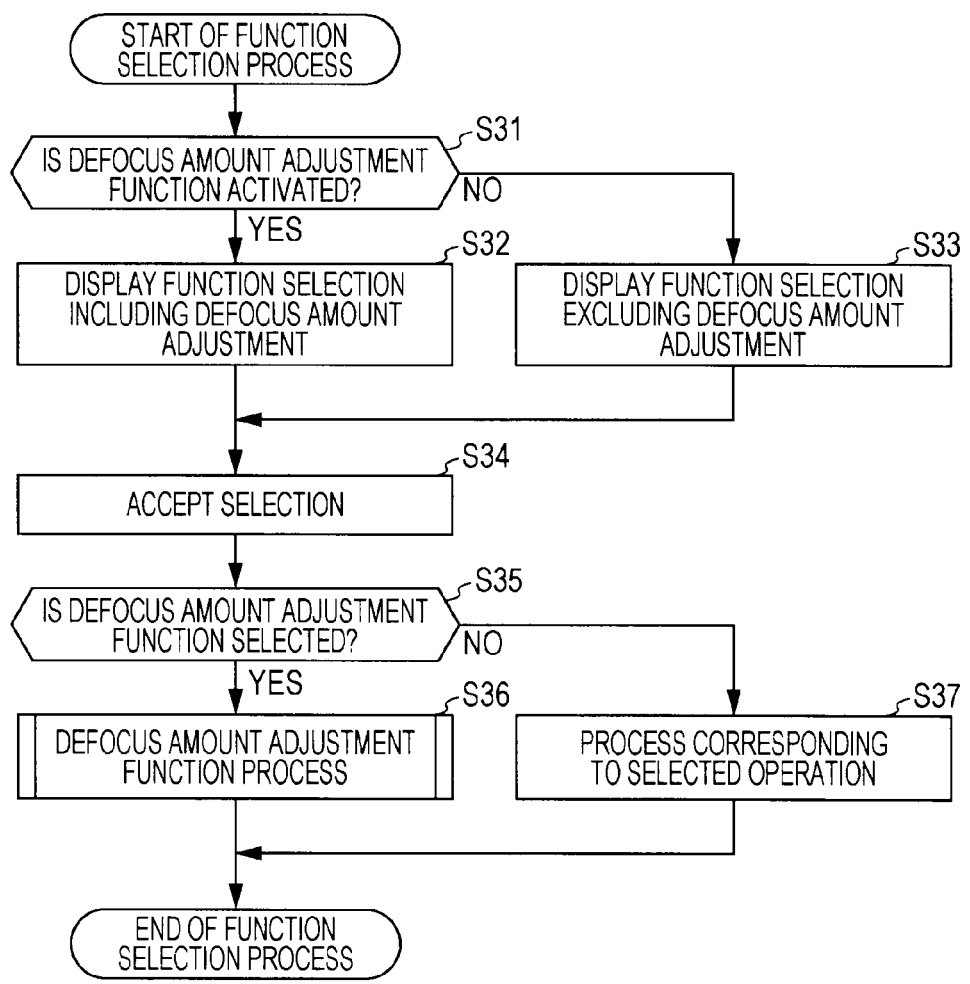
FIG. 8 is a flowchart of a function selection process according to the first embodiment.

Next, a function selection process which is executed by the imaging apparatus 2 will be described using FIG. 8. FIG. 8 is a flowchart of a function selection process according to the first embodiment. The function selection process is a process where an operation menu is displayed in the display section 113 due to an operation of the operation input section 116 and the selected operation is executed.

[Step S31] The imaging apparatus 2 determines whether or not the defocus amount adjustment function is activated. The imaging apparatus 2 progresses to step S32 in a case where the defocus amount adjustment function is activated and the imaging apparatus 2 progresses to step S33 in a case where the defocus amount adjustment function is not activated.

[Step S32] The imaging apparatus 2 displays the operation menu on the display section 113 so that the defocus amount adjustment is able to be selected. At this time, if there are other functions which are able to be selected, the operation menu is displayed on the display section 113 so as to include the other functions.

[Step S33] The imaging apparatus 2 displays the operation menu on the display section 113 so that the defocus amount adjustment is not able to be selected. At this time, if there are other functions which are able to be selected, the operation menu displays the other functions on the display section 113.

[Step S34] The imaging apparatus 2 receives the selection operation of the functions in the operation menu.

[Step S35] The imaging apparatus 2 determines whether or not the defocus amount adjustment function has been selected. The imaging apparatus 2 progresses to step S36 in a case where the defocus amount adjustment function has been selected and the imaging apparatus 2 progresses to step S37 in a case where the defocus amount adjustment function has not been selected.

[Step S36] The imaging apparatus 2 executes the defocus amount adjustment function and ends the function selection process.

[Step S37] The imaging apparatus 2 ends the function selection process by execution of the selected function or receiving a cancellation operation.

In this manner, in the imaging system 1, it is possible for the defocus amount adjustment function to be selected by an operator and executed.

Second Embodiment

Figures 9, 10:
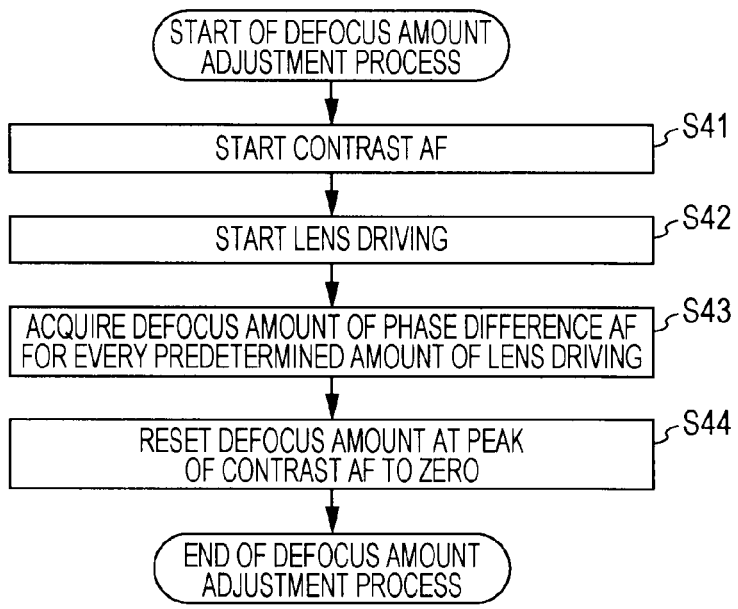
FIG. 9 is a flowchart of a defocus amount adjustment process according to a second embodiment.
FIG. 10 is a diagram illustrating one example of an adjustment information table of a mount adaptor according to a third embodiment.

Next, a defocus amount adjustment process according to a second embodiment will be described using FIG. 9. FIG. 9 is a flowchart of the defocus amount adjustment process according to the second embodiment.

The second embodiment is different in the point that the contrast amount is acquired in predetermined driving amount units of the lens 7 whereas the defocus amount adjustment process of the first embodiment acquires the contrast amount in predetermined defocus amount units of the AF sensor unit 13. In the detailed description of the second embodiment, the entire configuration of the imaging system 1 is the same as the first embodiment unless otherwise stated, and thus, the description thereof is omitted.

[Step S41] The imaging apparatus 2 starts a focus detection operation using the contrast method.

[Step S42] The imaging apparatus 2 starts driving of the lens 7.

[Step S43] The imaging apparatus 2 performs focus detection from a position where the focal point is in front of a subject through an exact focus position until a position where the focal point is behind a subject while driving the lens 7 in predetermined pitch units. In addition, the imaging apparatus 2 performs the focus detection using the phase difference method in parallel with the focus detection using the contrast method and a defocus amount of the AF sensor unit 13 is acquired for every predetermined driving amount of the lens 7.

[Step S44] The imaging apparatus 2 acquires an adjustment value (remaining defocus amount) which resets (clears to zero) the remaining defocus amount corresponding to the driving amount of the lens 7 when combining the focus detection using the peak value of the contrast amount, that is, the focus detection using the contrast method. The imaging apparatus 2 stores the adjustment value in the storage section 111 so as to correspond to the combination of the mount adaptor 10 and the lens 7 and ends the defocus amount adjustment process. The adjustment value which is acquired in this manner is stored in the storage section 111 as the imaging apparatus adjustment information table 130.

Third Embodiment

Next, an adjustment information table of a mount adaptor according to a third embodiment will be described using FIG. 10. FIG. 10 is a diagram illustrating one example of the adjustment information table of the mount adaptor according to the third embodiment. A mount adaptor adjustment information table 140 of the third embodiment is stored in the storage section 101 of the mount adaptor 10. In addition, the mount adaptor adjustment information table 140 is a data table where an adjustment amount corresponds to a combination of the lens 7 and the imaging apparatus 2 (camera). For example, with the combination of the camera (CB0) and the lens (L0), the corresponding adjustment amount is an adjustment amount (dm00). If it is the lens (L1) with the camera (CB0), the corresponding adjustment amount is an adjustment amount (dm01). In addition, if it is the camera (CB1) with the lens (L1), the corresponding adjustment amount is an adjustment amount (dm11).

The mount adaptor adjustment information table 140 records the adjustment value which corresponds to the combination of the imaging apparatus 2 and the lens 7 using the defocus amount adjustment process and reads out the adjustment value using the defocus amount adjustment function activation process.

Due to this, if the adjustment amount is recorded in the mount adaptor adjustment information table 140, it is possible for the imaging apparatus 2 to use this so that, even if there is a change in the combination of the mount adaptor 10 and the lens 7, it is not necessary to execute the defocus amount adjustment process at this time.

Here, the imaging apparatus 2 has identification information which identifies the imaging apparatus 2. The imaging apparatus 2 acquires identification information of the lens 7 from the mount adaptor 10 when the lens 7 is mounted on the imaging apparatus 2 using the mount adaptor 10 and identification of the lens 7 is performed. The identification information of the imaging apparatus 2 or the identification information of the lens 7 is, for example, individual identification code or product identification code. Due to each unit having an error even if it is the same product, it is desirable that identification of the imaging apparatus 2 and the lens 7 be performed using individual identification codes. Here, considering that it is generally seldom that a user has a plurality of the same product, there are no problems in practice even if the identification of the imaging apparatus 2 and the lens 7 is performed using product identification codes.

Here, the identification of the lens 7 and the imaging apparatus 2 may be performed by the mount adaptor 10 instead of the imaging apparatus 2. In this case, it is possible for the mount adaptor 10 to obtain the adjustment information from the imaging apparatus 2 and generate the mount adaptor adjustment information table 140.

Here, the control sections 100, 110, and 120 which were described in the first embodiment are controlled using a CPU (Central Processing Unit). In the CPU, a RAM (Random Access Memory), a ROM (Read Only Memory), a communication interface, and an input and output interface are connected via a bus.

In the RAM, at least a portion of an OS (Operating System) program or application program which is executed by the CPU is temporarily stored. In addition, various data which are necessary for processes executed by the CPU are stored in the RAM. The OS program and the application program are stored in the ROM. The communication interface is connected to other control sections via a communication line.

In the input and output interface, each input and output section are connected. It is possible to realize the processing function of the embodiments using the hardware configuration as above.

Here, it is possible for each control section to be each configured to include a module formed from a FPGA (Field Programmable Gate Array), a DSP (Digital Signal Processor), or the like or to be each configured to not have a CPU. In this case, each control section is each provided with a non-volatile memory and stores the firmware of the module. It is possible for the firmware to be written into the non-volatile memory via a portable recording medium or the communication interface. In this manner, it is possible for each control section to update the firmware by rewriting the firmware which is stored in the non-volatile memory.

Here, from the first embodiment to the third embodiment, the imaging system 1 which is provided with the mount adaptor 10 has been described, but an imaging apparatus which is provided with the thin film mirror 14 (optical device) instead of a reflex mirror is also able to be applied. This type of the imaging apparatus is provided with a contrast focus detection section which performs focus detection from contrast using an imaging device with one of the lights (for example, transmitted light) split from the incident light which is split by the thin film mirror 14. In addition, it is possible for this type of the imaging apparatus to be provided with a phase difference focus detection section which performs focus detection from a phase difference with the other light (for example, reflected light) split from the incident light which is split by the thin film mirror 14. In this case, it is possible for this type of the imaging apparatus to adjust the focus position of the phase difference focus detection section based on the focus detection using the contrast focus detection section. In addition, this type of the imaging apparatus may activate adjustment control of the focus position using detection of the mounting of the interchangeable lens.

Here, various changes are able to be made to the embodiments described above within the scope which does not depart from the concept of the disclosure.

Furthermore, various formats and changes of the embodiments described above are able to be made by those skilled in the art and the embodiments described above are not limited to the exact configurations or applied examples which have been described.

The present disclosure contains subject matter related to that disclosed in Japanese Priority Patent Application JP 2010-288025 filed in the Japan Patent Office on Dec. 24, 2010, the entire contents of which are hereby incorporated by reference.

What is claimed is:

1. An imaging system comprising:
    an imaging apparatus which is provided with an imaging device; and
    a mount adaptor which adjusts a flange focal length between the imaging apparatus and an interchangeable lens, wherein
        the mount adaptor is provided with a phase difference focus detection section which performs focus detection from a phase difference and an optical device which splits incident light from the interchangeable lens into incident light of the imaging device and incident light of the phase difference focus detection section, and
        the imaging apparatus is provided with a contrast focus detection section which performs focus detection from contrast using the imaging device, an adjustment section which adjusts a focus position of the phase difference focus detection section, and an adjustment control section which activates adjustment control of the focus position using detection of the mounting of the mount adaptor and the interchangeable lens,
        wherein the adjustment section performs adjustment of the focus position by resetting a remaining defocus amount which corresponds to the phase difference focus detection section in combination with focus detection using the contrast focus detection section and
        wherein the adjustment section acquires a contrast amount which is detected by the contrast focus detection section while a defocus amount is changed using the phase difference focus detection section and performs adjustment of the focus position with the defocus amount which corresponds to a peak value of the contrast amount as the remaining defocus amount.

2. The imaging system according to claim 1, wherein the imaging apparatus comprises an identification section which identifies the interchangeable lens and a storage section which stores the remaining defocus amount for each identified interchangeable lens.

3. The imaging system according to claim 2, wherein the identification section identifies the mount adapter, and the storage section stores the remaining defocus amount for each combination of the identified interchangeable lens and the identified mount adaptor.

4. The imaging system according to claim 1, wherein the mount adaptor is provided with an identification section which identifies the interchangeable lens, and a storage section which stores the remaining defocus amount for each of the identified interchangeable lenses.

5. The imaging system according to claim 4, wherein the identification section identifies the imaging apparatus, and the storage section stores the remaining defocus amount for each combination of the identified interchangeable lens and the identified imaging apparatus.

6. A mount adaptor, which adjusts a flange focal length between an imaging apparatus and an interchangeable lens, comprising:
    a phase difference focus detection section which performs focus detection from a phase difference;
    an optical device which splits a first incident light from the interchangeable lens into a second incident light entering the imaging device and a third incident light entering the phase difference focus detection section; and
    a storage section which stores an adjustment value which adjusts a focus position of the phase difference focus detection section, wherein
        the imaging apparatus comprises an adjustment section which adjusts, based on the adjustment value, the focus position by resetting a remaining defocus amount which corresponds to the phase difference focus detection section in combination with focus detection using a contrast focus detection section in the imaging apparatus, and
        wherein the adjustment section acquires a contrast amount which is detected by the contrast focus detection section while a defocus amount is changed using the phase difference focus detection section and performs adjustment of the focus position with the defocus amount which corresponds to a peak value of the contrast amount as the remaining defocus amount.

7. An imaging apparatus comprising:
    a defocus amount acquisition section which adjusts a flange focal length between the imaging apparatus and an interchangeable lens and acquires a defocus amount of a phase difference focus detection section of a mount adaptor, wherein the phase difference focus detection section performs focus detection using a phase difference method by splitting an incident light from an interchangeable lens;
    a contrast focus detection section which performs focus detection from a contrast process using an imaging device;
    a storage section which stores an adjustment value which adjusts a focus position of the phase difference focus detection section; and
    an adjustment section which adjusts, based on the adjustment value, the focus position by resetting a remaining defocus amount which corresponds to the phase difference focus detection section in combination with focus detection using the contrast focus detection section, wherein the adjustment section acquires a contrast amount which is detected by the contrast focus detection section while the defocus amount is changed using the phase difference focus detection section and performs adjustment of the focus position with the defocus amount which corresponds to a peak value of the contrast amount as the remaining defocus amount.

8. A non-transitory computer readable medium having stored thereon, a computer program having at least one code section executable by a computer, thereby causing the computer to perform the steps comprising:

adjusting, by a mount adapter, a flange focal length between an imaging apparatus and an interchangeable lens;

detecting focus from a phase difference by a phase difference focus detection section in the mount adapter;

splitting a first incident light from the interchangeable lens into a second incident light entering an imaging device in the imaging apparatus and a third incident light entering the phase difference focus detection section;

detecting focus from a contrast process using the imaging device by a contrast focus detection section in the imaging apparatus;

adjusting a focus position of the phase difference focus detection section by an adjustment section using detection of the mounting of the mount adapter and the interchangeable lens, wherein the adjustment section acquires a contrast amount which is detected by the contrast focus detection section while a defocus amount is changed using the phase difference focus detection section and performs adjustment of the focus position with the defocus amount which corresponds to a peak value of the contrast amount as a remaining defocus amount.

\* \* \* \* \*